United States Patent [19]

Curtis

[11] Patent Number: 5,694,697
[45] Date of Patent: Dec. 9, 1997

[54] TIRE MEASURING DEVICE

[76] Inventor: John Michael Curtis, R. D. #1, Box 227J, Cowansville, Pa. 16218

[21] Appl. No.: 582,862

[22] Filed: Jan. 4, 1996

[51] Int. Cl.$^6$ ............................................. G01B 5/08
[52] U.S. Cl. ................................. 33/203; 33/810; 33/555.1
[58] Field of Search ............................... 33/810, 811, 812, 33/809, 203, 555.1

[56] References Cited

U.S. PATENT DOCUMENTS

| | | | |
|---|---|---|---|
| 1,245,213 | 11/1917 | Gammeter | 33/203 |
| 1,327,216 | 1/1920 | Rouanet . | |
| 2,408,746 | 10/1946 | Evert . | |
| 2,566,407 | 9/1951 | Evans | 33/203 |
| 2,660,796 | 12/1953 | Lies | 33/812 |
| 2,841,874 | 7/1958 | Richardson | 33/203 |
| 3,986,267 | 10/1976 | Taylor . | |
| 4,114,279 | 9/1978 | Johnson et al. | 33/203 |
| 4,160,329 | 7/1979 | Scrimshaw . | |
| 4,268,968 | 5/1981 | Przybylinski et al. . | |
| 4,607,436 | 8/1986 | Clay | 33/203 |
| 4,700,484 | 10/1987 | Frank et al. . | |
| 5,022,267 | 6/1991 | Shattuck et al. . | |
| 5,197,200 | 3/1993 | Bahr et al. . | |

FOREIGN PATENT DOCUMENTS

| | | | |
|---|---|---|---|
| 750286 | 8/1933 | France | 33/203 |
| 3821764 | 1/1990 | Germany | 33/555.1 |
| 154861 | 8/1932 | Switzerland | 33/810 |
| 584179 | 12/1977 | U.S.S.R. | 33/555.1 |
| 114426 | 7/1918 | United Kingdom | 33/812 |

OTHER PUBLICATIONS

*Stock Car Racing* magazine, May 1995, p. 91.
*Stock Car Racing* magazine, Aug. 1995, p. 73.

*Primary Examiner*—Thomas B. Will
*Attorney, Agent, or Firm*—Aileen Champion Addessi

[57] ABSTRACT

A tire measuring device includes a first and second telescopic arm slidably attached together. The tire measuring device further includes a pair of handles, each disposed on one end of a rod for enabling a person to manipulate and transport the tire measuring device. A roller is disposed on an opposite end of each rod for rolling against a tire during the measurement process. The handles and rollers are detachably attached to the rods by use of grooves and ball set screws. A measuring instrument, such as a digital readout mechanism and a measurement track, is attached to at least one of the first and second telescopic arms for accurately and repeatably indicating a measurement of the tire. A guard is attached to the tire measuring device for providing protection to the measuring instrument. The first telescopic arm has a plurality of reference markings, and the second telescopic arm has a zero reference marking for alignment with the reference marking of the first telescopic arm to set a starting reference point for the tire measuring device. A pin may be inserted into apertures aligned with the reference markings for facilitating alignment of the reference markings. The components of the tire measuring device may be detached and housed within a case during storage.

19 Claims, 5 Drawing Sheets

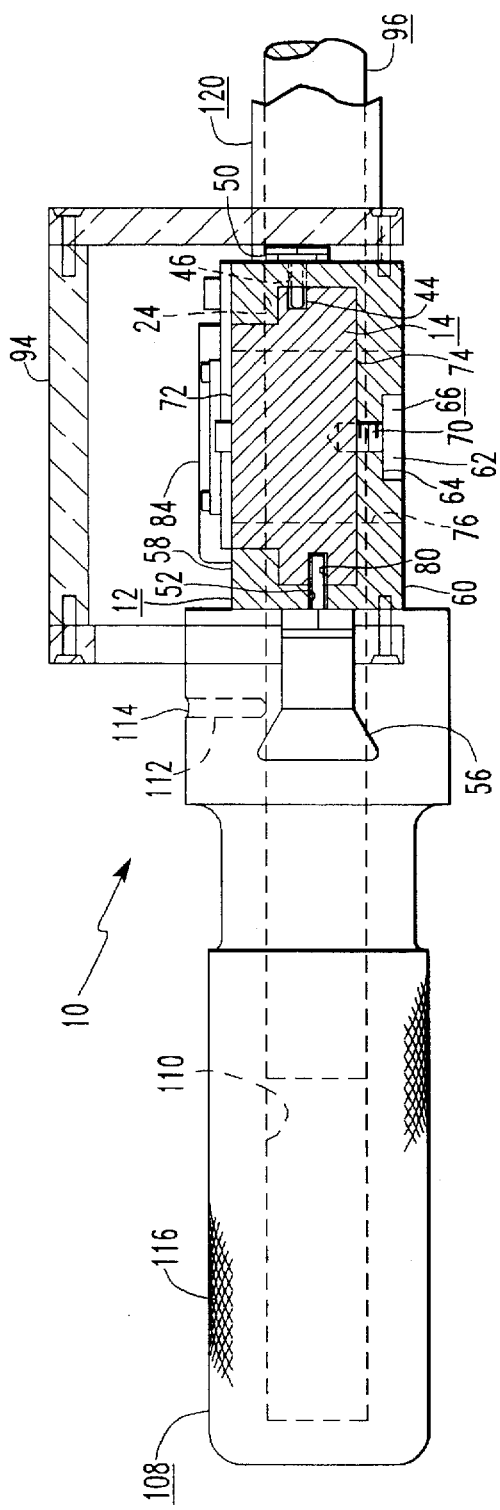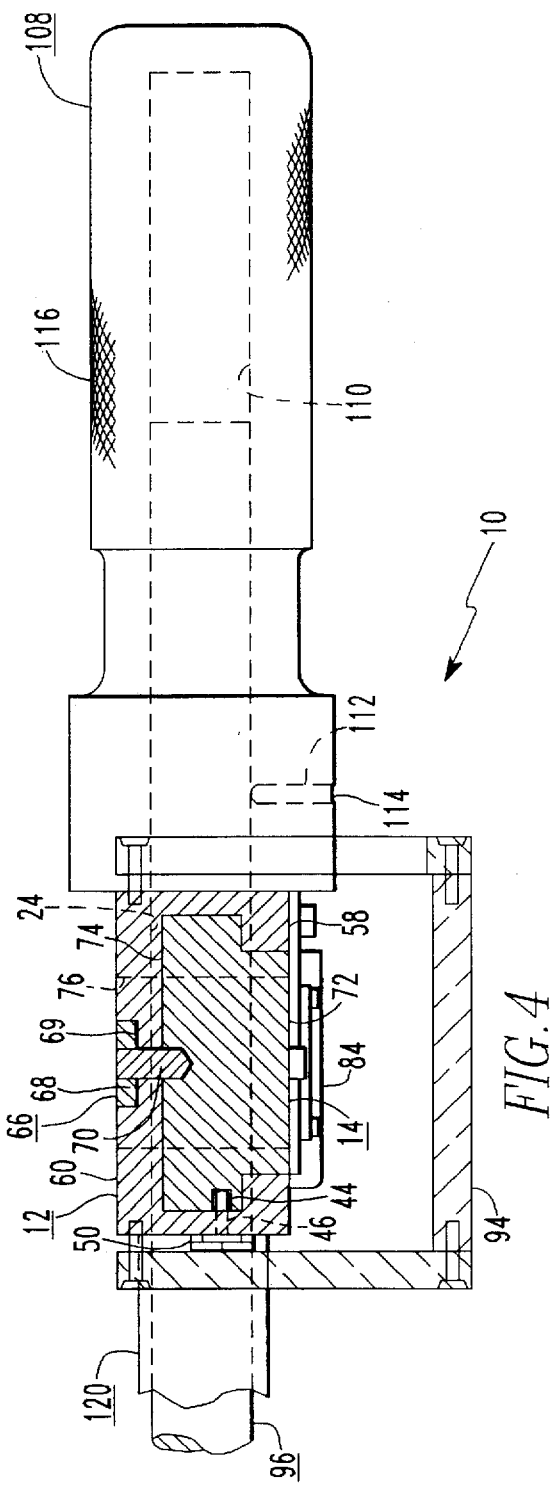

TIRE MEASURING DEVICE

BACKGROUND OF THE INVENTION

The invention relates to tire measuring devices and, more particularly, to a gauge for measuring the diameter of a tire.

Automobile racing requires that the diameter of automobile tires be within a particular range for each specific diameter of tire. Prior to each race, the diameter of the tires must be measured to verify that the tire is within the acceptable range. Also, the diameter of the tire is used to set stagger for the race car. Track surfaces and temperatures affect the diameter of race car tires. To set up the cars stagger or handling, the tires must be constantly measured to adjust air pressure accordingly.

There are several kinds of diameter measuring devices. One such device is disclosed in U.S. Pat. No. 2,408,746 issued Oct. 8, 1946 to Evert and entitled "Apparatus for Measuring Tires". The apparatus contacts three points of an arc of the tire, which is translated into a diametrical reading. However, the diameter is determined by reading graduated markings. People may visually read the graduated markings differently, producing a variety of readings for a single tire.

U.S. Pat. No. 4,160,329 issued Jul. 10, 1979 to Scrimshaw and entitled "Method and Apparatus for Measuring Pipe Coating Thickness" discloses using sensing arms having rollers which contact a pipe to be measured. The readout may be by using graduations or by a digital display. However, the apparatus is fixedly mounted in a permanent location and is not transposable.

Tire diameter measuring devices are disclosed in the *Stock Car Racing* magazines of May and August 1995. However, these devils do not utilize rollers to contact the tire, nor do the devices employ a digital readout.

Therefore, what is needed is an apparatus for measuring the diameter of a tire which utilizes a roller system for contacting the tire, has a digital readout for accuracy and repeatability, and is portable for transporting the measuring device to various locations and for using the device in various positions with respect to the tire.

SUMMARY OF THE INVENTION

A tire measuring device includes a first telescopic arm having a first end, a second end, and a plurality of reference markings, and a second telescopic arm having a first end, a second end, and a zero reference marking for alignment with the reference markings of the first telescopic arm. The first end of the second telescopic arm is slidably attached to the second end of the first telescopic arm.

The tire measuring device further includes a handle attached to at least one of the first and second telescopic arms for enabling a person to transport the tire measuring device. A first roller is positioned adjacent to the first end of the first telescopic arm for contacting a tire to be measured, and a second roller is positioned adjacent to the second end of the second telescopic arm for contacting the tire. A measuring instrument is positioned on at least one of the first and second telescopic arms for indicating a measurement of the tire being measured.

The tire measuring device further includes a first rod disposed within a first bore of the first telescopic arm, and a second rod disposed within a first bore of the second telescopic arm. The handles are disposed on one end of each of the first and second rods, and the rollers are disposed on the other end of the first and second rods. The handles and rollers are detachably attached to the rods by use of grooves and ball set screws.

The measuring instrument may include a digital readout mechanism attached to the first telescopic arm having a digital display for displaying a measurement, and a measurement track attached to the second telescopic arm cooperable with the digital readout mechanism for indicating the measurement of the tire being measured. A guard is attached to one of the first and second telescopic arms for providing protection to the measuring instrument.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

FIG. 3 is a view taken along line 3—3 of FIG. 1;

FIG. 4 is a view taken along line 4—4 of FIG. 2; and

DESCRIPTION OF THE PREFERRED EMBODIMENT

Figure 1:
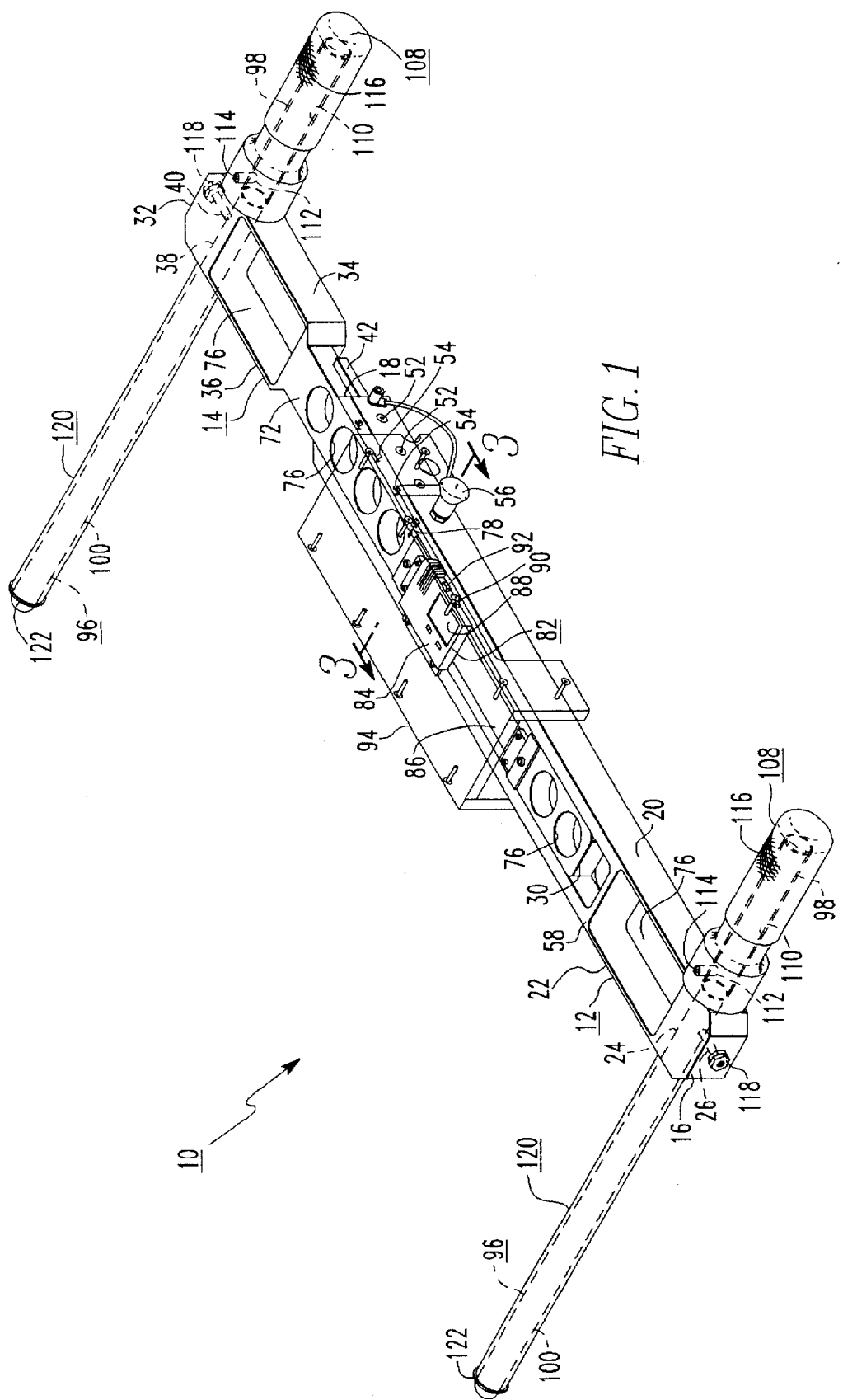
FIG. 1 is an isometric view of a tire measuring device.
Figure 1A:
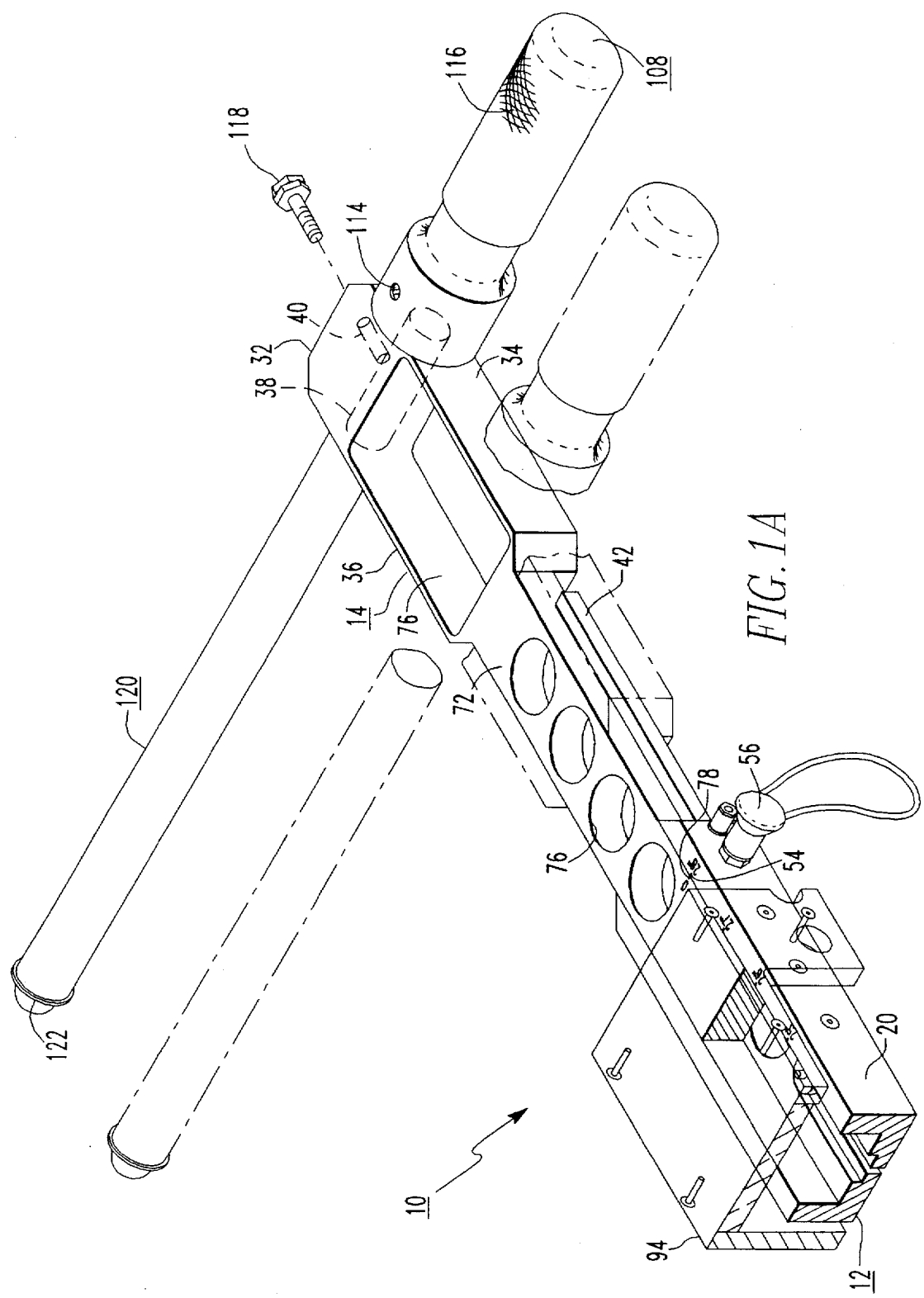
FIG. 1A is a partial view showing movement of the tire measuring device in phantom lines.
Figure 2:
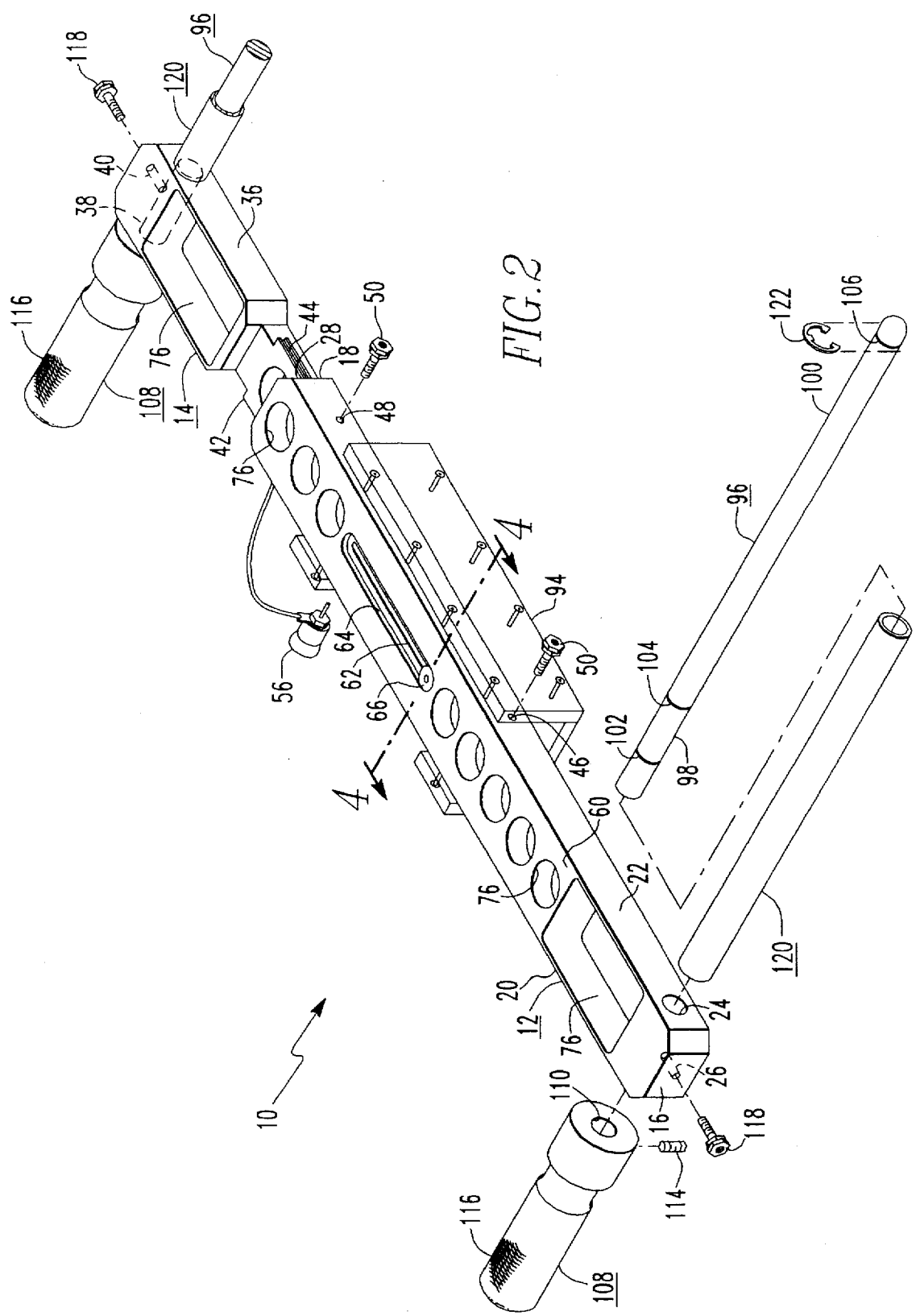
FIG. 2 is a partial exploded view of a second side of the tire measuring device.

Referring to FIGS. 1, 1A, 2, 3 and 4, a tire measuring device 10 is used for measuring the diameter of a vehicle's tire (not shown), such as an automobile tire, truck tire, or the like. The tire measuring device 10 may also be used for measuring various other dimensions of the tire, such as the width of the tire, bead of the tire, or the like. The components of the tire measuring device may be constructed from aluminum, stainless steel, plastic, or any other suitable material, and may have an anodized coating.

The tire measuring device 10 includes a first telescopic arm 12 and a second telescopic arm 14. The first telescopic arm 12 has a first end 16, a second end 18, a first edge 20 and a second edge 22. A first bore 24 is positioned adjacent to the first end 16 and extends therethrough from the first edge 20 to the second edge 22. A second bore 26 is positioned substantially perpendicular to the first bore 24 and extends from the first end 16 to the first bore 24. The second end 18 has a T-shaped slot 28.

The second telescopic arm 14 has a first end 30, a second end 32, a first edge 34 and a second edge 36. A first bore 38 is positioned adjacent to the second end 32 and extends therethrough from the first edge 34 to the second edge 36. A second bore 40 is positioned substantially perpendicular to the first bore 38 and extends from the second end 32 to the first bore 38. The first end 30 has a T-shaped portion 42 for slidable engagement with the T-shaped slot 28 of the first telescopic arm 12. The T-shaped portion 42 has a groove 44 extending along at least one edge of the T-shape. As an alternative, the T-shaped slot 28 and portion 42 may have any shape configuration for mateably attaching together the first and second telescopic arms 12 and 14.

The second edge 22 of the first telescopic arm 12 has a third bore 46 and a fourth bore 48 positioned substantially parallel to the first bore 24 and extending from the second edge 22 to the T-shaped slot 28. A ball set screw 50 is disposed within each of the third and fourth bores 46 and 48 of the first telescopic arm 12 and engagable with the groove 44 of the second telescopic arm 14 for enabling adjustment between the first and second telescopic arms 12 and 14.

The first edge 20 of the telescopic arm 12 has a plurality of apertures 52 positioned substantially parallel to the first bore 24 and extending from the first edge 20 therethrough. A reference marking 54 is aligned with each of the apertures 52. The reference marking 54 may include numerical and tick markings identifying various measurement units. The reference markings 54 provide a zeroing point for different sized tires.

A pin 56 is attached to the first telescopic arm 12, such as to the first edge 20, in a manner so that the pin 56 may be inserted into any of the apertures 52 in the first telescopic arm 12. An insert may be positioned in the aperture 52 having a bore sized and adapted to receive the pin 56.

The first telescopic arm 12 has a first side 58 and a second side 60. The second side 60 has a channel 62 with a flange 64 sized and adapted to engage a shoulder bolt 66 attached to the second telescopic arm 14. The shoulder bolt 66 has a first end 68 having an enlarged portion with a shoulder 69 and a second end 70. The enlarged portion is sized and adapted to slide along the flange 64 of the channel 62 and the second end 70 is sized and adapted to be disposed through the channel 62 and attached to the second telescopic arm 14 for slidably attaching together the first and second telescopic arms 12 and 14. The shoulder bolt 66 may be adjusted for altering the position of the first telescopic arm 12 with respect to the second telescopic arm 14. The channel 62 provides a stop for the telescopic movement of the arms 12 and 14.

The second telescopic arm 14 has a first side 72 and a second side 74. The first and second telescopic arms 12 and 14 have a plurality of holes 76 extending from the first sides 58 and 72, respectively, to the second sides 60 and 74, respectively, or from the second side 60 to the T-shaped portion 42 for reducing the overall weight of the tire measuring device 10. Alternatively, the holes 76 may extend only partially therethrough or may be positioned in any convenient location for providing a reduction in weight.

The second telescopic arm 14 has a reference marking 78. The reference marking 78 may include a tick marking and a numerical marking, such as a zero. An aperture 80 is aligned with the zero reference marking 78 and is engagable with the pin 56 for alignment with the reference markings 54 on the first telescopic arm 12.

A measuring instrument 82 is attached to the first and second telescopic arms 12 and 14. The measuring instrument 82 includes a digital readout mechanism 84 which is attached to the second telescopic arm 14 and cooperates with a measurement track 86, which is attached to the first telescopic arm 12, for providing a digital reading of the tire's diameter or other desired measurement. The digital readout mechanism 84 includes a digital display 88, an on/off switch 90, and a zeroing switch 92.

Alternatively, the measuring instrument 82 may be graduated markings calibrated to enable a person to visually determine the diameter or other desired measurement of the tire. As an example, the graduated markings may include numerical and tick markings.

As yet another alternative, the digital display 88 may be detached from the tire measuring device 10 and positioned in a remote location, such as on a control panel or the like.

A guard 94 is attached to the tire measuring device 10, such as to the first telescopic arm 12, for protecting the measuring instrument 82. Preferably, the guard 94 is formed from a transparent plastic for enabling a person to visually read the digital display 88.

A rod 96 having a first end 98 and a second end 100 is sized and adapted to be disposed within the first bores 24 and 38 of the first and second telescopic arms 12 and 14, respectively. The rod 96 has a first groove 102 and a second groove 104 positioned at the first end 98 and a third groove 106 positioned at the second end 100.

A handle 108 has a first bore 110 partially therethrough sized and adapted to be positioned on the first end 98 of the rod 96. The handle 108 has a second bore 112 positioned substantially perpendicular to the first bore 110 and extending from an outside surface of the handle 108 to the first bore 110. An adjustable ball set screw 114 may be disposed through the second bore 112 and engaged with the first groove 102 of the rod 96 for securing the handle 108 to the rod 96. The handle 108 has a knurled portion 116 for enabling a person to grasp the tire measuring device 10.

An adjustable ball set screw 118 may be disposed in the second bores 26 and 40, respectively, of the first and second telescopic arms 12 and 14. The ball set screw 118 is engagable with the second groove 104 of the rod 96 for securing the rods 96 and the first and second telescopic arms 12 and 14 together.

A roller 120 is sized and adapted to be positioned on the rod 96. The roller 120 is positioned on one of the first edges 20 and 34 and second edges 22 and 36 of the first and second telescopic arms 12 and 14 and the handle 108 is positioned on the other of the first edges 20 and 34 and second edges 22 and 36 of the first and second telescopic arms 12 and 14. The roller 120 is retained on the rod 96 by a snap ring 122 positioned in the third groove 106 of the rod 96. The roller 120 may be held in position by bearings and bushings for facilitating rotation of the roller 120 on the rod 96.

Preferably, the tire measuring device 10 has two handles 108, two rods 96 and two rollers 120. The rollers 120 are positioned on diametrically opposite points of the tire being measured. Alternatively, the tire measuring device 10 may have one rotating contact point, such as the roller 120, and one stationary contact point, such as the rod 96 without a roller 120 disposed thereon.

Figure 5:
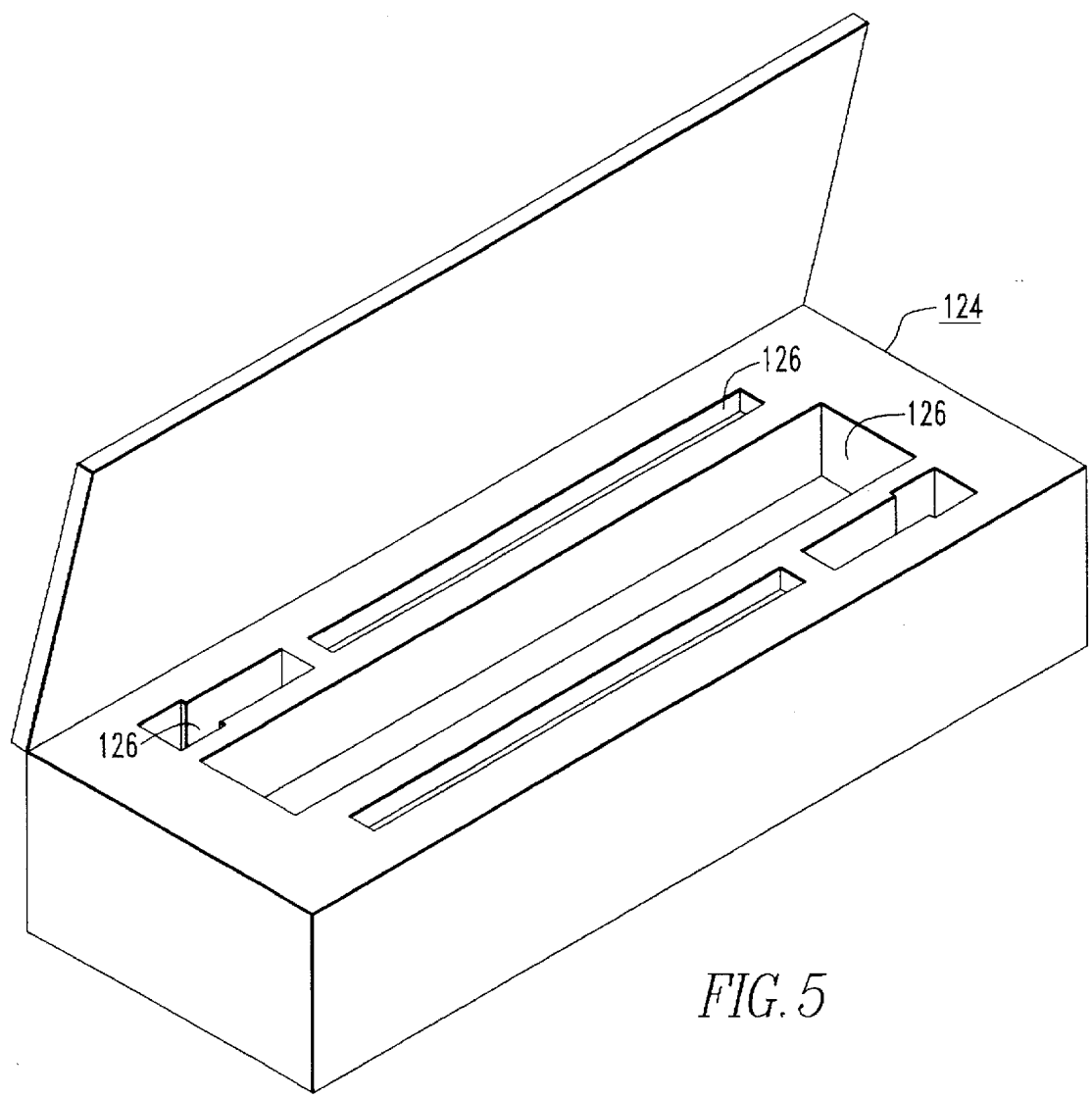
FIG. 5 is an isometric view of a case for storage of the tire measuring device.

Referring to FIG. 5, the components of the tire measuring device 10 may be detached and stored within a case 124 during non-use. As one example, the case 124 may have retaining portions, such as recessed compartments 126, for placement of the various components of the tire measuring device 10. Alternatively, the components may be snapped into place with clips or any other suitable storage configuration may be used.

In operation, the first and second telescopic arms 12 and 14 remain connected and telescopically slide with respect to each other for adjusting the distance between the rollers 120. The zero reference marking 78 of the second telescopic arm 14 is aligned with the desired reference marking 54 of the first telescopic arm 12. The pin 56 is inserted into the aperture 52 of the first telescopic arm 12 and then into the aperture 80 of the second telescopic arm 14. The measuring instrument 82 is turned ON with the on/off switch 90 and is zeroed with the zeroing switch 92.

The pin 56 is removed. A person may grasp the handles 108 and position the tire measuring device 10 on a tire by rolling the rollers 120 against the tire, telescoping the first and second telescopic arms 12 and 14, until the highest measurement is observed. The measuring instrument displays the deviation from the reference point. As an alternative to displaying the deviation, the measuring instrument may display the actual dimensions of the tire.

An advantage of the tire measuring device 10 is that repeatability and accuracy of the reading is obtained by use of the digital readout 88 of the measuring instrument 82, as compared to the variations often obtained by a person visually reading calibrated markings. The measuring instrument 82 automatically displays the desired measurement. In addition to measuring a tire, the tire measuring device 10 may also be used to measure the dimensions of any object.

Another advantage is that the roller system of the tire measuring device 10 increases the accuracy of the reading by reducing the amount of pressure exerted by the tire measuring device 10 onto the tire to be measured. Without the use of the rollers 120, a tire measuring gauge may exert pressure onto a tire, altering the dimensions of the tire and producing inaccurate measurements.

The tire measuring device 10 is portable and may be carried to any desired location. The use of the handles 108 enables a person to manipulate the tire measuring device 10, without having to fixedly attach the tire measuring device 10 in a permanent location.

The components of the tire measuring device 10 are detachable, adding to the convenience and transportability of the device 10. The use of a plurality of ball set screws enables the components of the tire measuring device 10 to be adjusted with respect to one another.

Thus there has been shown and described a novel tire measuring device which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A tire measuring device, comprising:

a first telescopic arm having a first end, a second end, a plurality of reference markings, and an aperture positioned adjacent to each of said reference markings;

a second telescopic arm having a first end, a second end, a zero reference marking for alignment with said reference markings of said first telescopic arm, and an aperture positioned adjacent to said zero reference marking, said first end of said second telescopic arm slidably attached to said second end of said first telescopic arm;

a pin attached to one of said first and second telescopic arms sized and adapted to be disposed within said aligned apertures of said first and second telescopic arms;

at least one handle attached to at least one of said first and second telescopic arms for enabling a person to manipulate said tire measuring device;

at least one roller rotatably attached to at least one of said first and second telescopic arms for contacting a tire to be measured;

at least one rod attached to at least one of said first and second telescopic arms for positioning said tire between said roller and said rod; and a measuring instrument positioned on at least one of said first and second telescopic anus for indicating a measurement of said tire being measured.

2. The tire measuring device according to claim 1, wherein:

said first telescopic arm has a first edge and a second edge, said first end of said first telescopic arm has a first bore extending from said first edge to said second edge;

said second telescopic arm has a first edge and a second edge, said second end of said second telescopic arm has a first bore extending from said first edge to said second edge; and said at least one rod is disposed within said first bore of one of said first and second telescopic arms, said rod has a first end and a second end.

3. The tire measuring device according to claim 2, wherein:

said at least one handle is disposed on one of said first and second ends of said rod for securing said handle to said rod; and said at least one roller is disposed on the other of said first and second ends of said rod for contacting said tire to be measured.

4. The tire measuring device according to claim 1, wherein said measuring instrument includes:

a digital readout mechanism attached to one of said first and second telescopic arms and having a digital display for displaying a measurement; and a measurement track attached to the other of said first and second telescopic arms cooperable with said digital readout mechanism for indicating the measurement of said tire being measured.

5. The tire measuring device according to claim 1, wherein:

said second end of said first telescopic arm has a T-shaped slot; and said first end of said second telescopic arm has a T-shaped portion engagable with said T-shaped slot.

6. The tire measuring device according to claim 1, further comprising:

said second side of said first telescopic arm having a channel with a flange; and a bolt, attached to said second telescopic arm and slidable within said channel of said first telescopic arm, having a shoulder sized and adapted to abut said flange for retaining together and restricting telescopic movement of said first and second telescopic arms.

7. The tire measuring device according to claim 1, further comprising a guard attached to one of said first and second telescopic arms for providing protection to said measuring instrument.

8. The tire measuring device according to claim 2, further comprising:

said first telescopic arm having a second bore extending from said first end to said first bore;

said second telescopic arm having a second bore extending from said second end to said first bore;

each of said rods having a first groove and a second groove positioned at said first end, and a third groove positioned at said second end;

a ball set screw disposed within each of said second bores of said first and second telescopic arms and engagable with said second grooves of said rods for detachably securing said rods and said first and second telescopic arms together;

each of said handles having a first bore sized and adapted to be disposed on said rod and having a second bore in communication with said first bore;

a ball set screw disposed within each of said second bores of said handles and engagable with said first grooves of said rods for detachably securing said handles and said rods together; and a lock washer positioned within each of said third grooves of said rods for retaining said rollers on said rods.

9. A tire measuring device, comprising:

a first telescopic arm having a first end, a second end, a first edge, a second edge, and a plurality of reference markings, said first end having a first bore extending from said first edge to said second edge;

a second telescopic arm having a first end, a second end, a first edge, a second edge, and a zero reference marking for alignment with said reference marking of said first telescopic arm, said first end of said second telescopic arm slidably attached to said second end of said first telescopic arm, said second end having a first bore extending from said first edge to said second edge;

a first rod disposed within said first bore of said first telescopic arm having a first end and a second end;

a second rod disposed within said first bore of said second telescopic arm having a first end and second end;

a first handle attached to one of said first and second ends of said first rod for securing said first handle to said first rod;

a second handle attached to one of said first and second ends of said second rod for securing said second handle to said second rod;

a first roller disposed on the other of said first and second ends of said first rod for contacting a tire to be measured;

a second roller disposed on the other of said first and second ends of said second rod for contacting said tire;

a digital readout mechanism attached to said first telescopic arm and having a digital display for displaying a measurement; and a measurement track attached to said second telescopic arm cooperable with said digital readout mechanism for indicating the measurement of said tire being measured.

10. The tire measuring device according to claim 9, further comprising a guard attached to one of said first and second telescopic arms for providing protection to said digital readout mechanism and said measurement track.

11. The tire measuring device according to claim 9, wherein:

said second end of said first telescopic arm has a T-shaped slot; and said first end of said second telescopic arm has a T-shaped portion engagable with said T-shaped slot.

12. The tire measuring device according to claim 9, further comprising:

said first telescopic arm having an aperture positioned adjacent to each of said reference markings;

said second telescopic arm having an aperture positioned adjacent to said zero reference marking; and a pin attached to one of said first and second telescopic arms sized and adapted to be disposed within said aligned apertures of said first and second telescopic arms.

13. The tire measuring device according to claim 9, further comprising:

said second side of said first telescopic arm having a channel with a flange; and a bolt attached to said second telescopic arm and slidable within said channel of said first telescopic arm having a shoulder sized and adapted to abut said flange for retaining together and restricting telescopic movement of said first and second telescopic arms.

14. The tire measuring device according to claim 9, wherein said first and second handles, said first and second rollers, and said first and second rods are detachable.

15. The tire measuring device according to claim 9, wherein:

said first telescopic arm has a plurality of holes for reducing the overall weight of the tire measuring device; and said second telescopic arm has a plurality of holes for reducing the overall weight of the tire measuring device.

16. A tire measuring device, comprising:

a first telescopic arm having a first end, a second end with a T-shaped slot, a first edge, a second edge, a first side and a second side, said first end having a first bore extending from said first edge to said second edge, said first end having a second bore extending from said first end to said first bore, said second edge having a third bore and a fourth bore extending from said second edge to said T-shaped slot, said first side having a plurality of reference markings and said first edge having an aperture positioned adjacent to each of said reference markings, and said second side having a channel;

a second telescopic arm having a first end with a T-shaped portion, a second end, a first edge, a second edge, a first side and a second side, said first end of said second telescopic arm slidably attached to said second end of said first telescopic arm, said second end having a first bore extending from said first edge to said second edge, said second end having a second bore extending from said second end to said first bore, said first edge having an aperture and said first side having a zero reference marking positioned adjacent to said aperture for alignment with said reference markings of said first telescopic arm;

a pin attached to one of said first and second telescopic arms sized and adapted to be disposed within said aligned apertures of said first and second telescopic arms;

a first rod disposed within said first bore of said first telescopic arm having a first end with a first groove and a second groove, and a second end with a third groove;

a second rod disposed within said first bore of said second telescopic arm having a first end with a first groove and a second groove, and second end with a third groove;

a ball set screw disposed within each of said second bores of said first and second telescopic arms and engagable with said second grooves of said first and second rods for detachably securing said first and second rods and said first and second telescopic arms together;

a first handle having a first bore sized and adapted to be disposed on one of said first and second ends of said first rod and having a second bore in communication with said first bore;

a second handle having a first bore sized and adapted to be disposed on one of said first and second ends of said second rod and having a second bore in communication with said first bore;

a ball set screw disposed within each of said second bores of said first and second handles and engagable with said first grooves of said first and second rods for detachably securing said first and second handles and said first and second rods together;

a first roller disposed on the other of said first and second ends of said first rod;

a second roller disposed on the other of said first and second ends of said second rod;

a lock washer positioned within each of said third grooves of said first and second rods for retaining said first and second rollers on said first and second rods;

a bolt attached to said second telescopic arm and slidable within said channel of said first telescopic arm for restricting telescopic movement of said first and second telescopic arms with respect to one another;

a digital readout mechanism attached to said first telescopic arm having a digital display for displaying a measurement;

a measurement track attached to said second telescopic arm cooperable with said digital readout mechanism for indicating the measurement of an object being measured; and a guard attached to one of said first and second telescopic arms for providing protection to said digital readout mechanism and said measurement track.

17. The tire measuring device according to claim 16, wherein:

said first telescopic arm has a plurality of holes for reducing the overall weight of the tire measuring device; and said second telescopic arm has a plurality of holes for reducing the overall weight of the tire measuring device.

18. The tire measuring device according to claim 16, wherein said guard is formed from a transparent material.

19. The tire measuring device according to claim 16, further comprising a case having retaining portions for storage of the tire measuring device.

* * * * *